United States Patent
Matsumoto

(10) Patent No.: US 6,833,841 B2
(45) Date of Patent: Dec. 21, 2004

(54) IMAGE FORMING METHOD, COMPUTER PROGRAM FOR FORMING IMAGE, AND IMAGE FORMING APPARATUS

(75) Inventor: Hiroshi Matsumoto, Taito-ku (JP)

(73) Assignee: Konami Corporation, Tokyo (JP)

( * ) Notice: Subject to any disclaimer, the term of this patent is extended or adjusted under 35 U.S.C. 154(b) by 268 days.

(21) Appl. No.: 10/143,220

(22) Filed: May 9, 2002

(65) Prior Publication Data

US 2002/0167535 A1 Nov. 14, 2002

(30) Foreign Application Priority Data

May 14, 2001 (JP) ........................................ 2001-143209

(51) Int. Cl.$^7$ .............................................. G09G 5/377
(52) U.S. Cl. ........................................ 345/634; 345/682
(58) Field of Search ................................ 345/672, 682, 345/629, 634; 463/31–33; 348/595, 600

(56) References Cited

U.S. PATENT DOCUMENTS

| | | | | |
|---|---|---|---|---|
| 5,343,218 A | * | 8/1994 | Maeda | ........................ 345/641 |
| 5,896,131 A | | 4/1999 | Alexander | |
| 6,078,305 A | * | 6/2000 | Mizutani | ..................... 345/629 |
| 6,088,018 A | * | 7/2000 | DeLeeuw et al. | ........... 345/629 |
| 6,151,030 A | | 11/2000 | DeLeeuw et al. | |
| 6,483,503 B1 | * | 11/2002 | Spannaus et al. | ........... 345/213 |

OTHER PUBLICATIONS

Anonymous: "Translucent window" Research Disclosure, Kenneth Mason Publications, Hampshire, GB vol. 315, No. 27, Jul. 1990.

* cited by examiner

*Primary Examiner*—Jeffery A. Brier
(74) *Attorney, Agent, or Firm*—Jordan and Hamburg LLP

(57) ABSTRACT

There is provided an image forming method capable of displaying an object in a semitransparent state without combining the object with a background and further, capable of improving a quality of an image. In the object, the transparent area and the non-transparent area are alternately arranged in at least one direction. The object is superposed and depicted in front of a predetermined background across a plurality of frames while alternating the transparent area and the non-transparent area at least partially. It is detected the change of a position of the object between one frame and another subsequent frame, and the alternation of the transparent area and the non-transparent area is controlled on the basis of this change.

12 Claims, 4 Drawing Sheets

Mth FRAME

Nth FRAME

MOVE IN X AND Y DIRECTIONS BY ONE PIXEL

MOVE IN X DIRECTION BY ONE PIXEL

MOVE IN Y DIRECTION BY ONE PIXEL

IMAGE FORMING METHOD, COMPUTER PROGRAM FOR FORMING IMAGE, AND IMAGE FORMING APPARATUS

BACKGROUND OF THE INVENTION

The present invention relates to a method for forming an image to display a background with being seen through an object.

As an art for displaying a background with being seen through an object, which is displayed on a game picture, an alpha-blending method and an additive blending method or the like have been known. Owing to the improvement of the processing capacity of a computer, even in a field of a personal game machine, the number of a type of a game machine provided with such an image processing function are increased. However, the details of such a type of a game machine are variously different in response to the capabilities, which are demanded for the game machine. Generally, while a manufacture mounts a high degree of an image processing function for forming a high quality image in a stationary game machine in competition with other rivals, there is a case that the image processing function is limited in a portable game machine with decreasing of a load of the image processing or the like in diagram. As an example of such limitation, in the case that a plurality of semitransparent objects are superposed, there may be a game machine such that a semitransparent object to be depicted at the headmost side is only blended with a background image at the furthest back with ignoring middle objects.

However, as described above, in the case of only blending the headmost semitransparent object as a background image, the depiction of the middle object is omitted, so that an unnatural image may be formed. For example, in a scene such that a semitransparent smoke is displayed at the headmost side as an object, that smoke is only blended with the background image, so that the depiction of the character or the like between the smoke and the background image is omitted and a character is erased from the game picture.

On the other hand, as a method, whereby an object can be seen through without blending images, there is known processing in which transparent areas and non-transparent areas are alternately arranged by one or some pixels in an object to be superposed at a front side so as to form a grid, and the background can be observed through the transparent areas. However, according to this method, the appearance of the transparent areas of the object is noticeably different from the appearance of the non-transparent areas of the object depending on the sizes of the transparent area and the non-transparent area, so that this involves a problem such that surface roughness is generated on the image.

SUMMARY OF THE INVENTION

An object of the present invention is to provide image forming method and apparatus, which are capable of displaying a semitransparent object without blending the object with a background and are capable of improving a quality of the image, and a program to be used in the method.

According to the first aspect of the present invention, there is provide an image forming method comprising the steps of: depicting a predetermined background; and depicting an object, in which a transparent area and a non-transparent area are alternately arranged in at least one direction, so as to superpose said object on the background, wherein, in the step of depicting an object, said transparent area and said non-transparent area are alternated between a plurality of frames in at least part of said object.

According to the present invention, while the background of the object is observed through the transparent area, the object itself is represented by the non-transparent area, so that it is possible to display the object in a semitransparent state. Since the transparent area and the non-transparent area are alternated between a plurality of frames, so that the difference of the appearances between the transparent area and the non-transparent area becomes inconspicuous in comparison with a case that respective areas are fixed. In other words, when the transparent area and the non-transparent area are fixed, respectively, the same portions of the front object and its background are seen, respectively, so that a user becomes aware of the difference of the appearances between the transparent area and the non-transparent area and the user is perceives this difference as roughness on the image. However, according to the present invention, by alternating the transparent areas and the non-transparent areas, the portions of the front object and its background to be seen are dynamically changed between the plural frames. As a result, it becomes difficult for the user to become aware of the difference of the appearances between the transparent area and the non-transparent area, so that the roughness on the screen is resolved. Particularly, in the case of displaying the object or the like on a display apparatus such as a liquid crystal monitor, of which reaction speed (a speed that the displayed content is changed) is relatively slow, the user never becomes aware of the difference between the transparent area from the non-transparent area by shortening an alternation period of the transparent area from the non-transparent area and further, the user gets the impression such that the object which is arranged at the front side is semitransparent in all portions.

The image forming method according to the present invention can be applied in the case that an object moves on the screen such as a game picture and also in the case that an object stands still on the screen. However, in the case that a position of the object is changed, there may be a case that the portion of the background to be seen is changed since the transparent area and the non-transparent area are moved. In such a case, if the transparent area and the non-transparent area are alternated, the portion to be seen is not changed. As a result, there may be a case that the effect of the present invention is counterbalanced. Accordingly, particularly, in the case that the object moves, it is preferable that the foregoing change of the position of the object between one frame and another frame subsequent thereto is detected and the alternation of the transparent area and the non-transparent area is controlled on the basis of that change.

According to the step of controlling alternation, it may be decided whether or not a predetermined area on a screen, which is identical with said transparent area in said one frame, is identical with said transparent area again in said another frame on an assumption that the alternation is not performed, and if identical, said alternation may be carried out in said another frame while said alternation may be postponed in said another frame if not identical. In this case, the area on the screen, which is identical with the transparent area in one frame, is identical with the non-transparent area in another frame and the area on the screen, which is identical with the non-transparent area in one frame, is identical with the transparent area in another frame, so that it is possible to bring about the effect of the present invention to the fullest extent.

Particularly, in the case that the foregoing transparent area and the foregoing non-transparent area are alternately arranged by one pixel in a lengthwise direction and a crosswise direction, a binary value obtained by adding coordinate values in the lengthwise direction and the crosswise direction, which define a position of said object on the screen, maybe calculated in said one frame and said another frame, respectively, in the step of controlling alternation, and then, if the lowest digit in respective added values are not changed, said alternation may be carried out in said another frame, while said alternation may be postponed in said another frame if the lowest digit in respective added values are changed. By performing suchlike processing, it is possible to easily decide whether a predetermined area on the screen is identical with the transparent area again or not in the case that it is assumed that the area on the screen, which is identical with the transparent area in one frame, is not alternated in another frame.

It is preferable that the foregoing one frame and the foregoing another frame are continuous to each other. As a result, it is decided whether or not the transparent area and the non-transparent area should be alternated for each frame, so that it is possible to form an image having the same quality as that of an image provided with the highly developed semitransparent processing by limiting the alternation period of the both areas as short as possible.

According to another aspect of the present invention, there is provided a program for forming an image, which is configured to make a computer perform the steps of: depicting a predetermined background; and depicting an object, in which a transparent area and a non-transparent area are alternately arranged in at least one direction, so as to superpose said object on the background, wherein, in the step of depicting an object, said transparent area and said non-transparent area are alternated between a plurality of frames in at least part of said object.

By executing this program with a computer, it is possible to realize the image forming method according to the present invention.

The program according to the present invention may include a following mode.

Said step of depicting an object further may include the steps of: detecting a change of a position of said object between one frame and another frame subsequent thereto; and controlling alternation of said transparent area and said non-transparent area on the basis of said change.

In the step of controlling alternation, it may be decided whether or not a predetermined area on a screen, which is identical with said transparent area in said one frame, is identical with said transparent area again in said another frame on an assumption that the alternation is not performed, and if identical, said alternation may be carried out in said another frame while said alternation may be postponed in said another frame if not identical. Said transparent area and said non-transparent area may be alternately arranged by one pixel in a lengthwise direction and a crosswise direction, and in the step of controlling alternation, a binary value obtained by adding coordinate values in the lengthwise direction and the crosswise direction, which define a position of said object on the screen, maybe calculated in said one frame and said another frame, respectively, and then, if the lowest digit in respective added values are not changed, said alternation may be carried out in said another frame, while said alternation may be postponed in said another frame if the lowest digit in respective added values are changed. Said one frame and said another frame may be continuous to each other.

According to still another aspect of the present invention, there is provided an image forming apparatus, comprising: a device for depicting a predetermined background; and a device for depicting an object, in which a transparent area and a non-transparent area are alternately arranged in at least one direction, so as to superpose said object on the background, wherein said device for depicting an object alternates said transparent area and said non-transparent area between a plurality of frames in at least part of said object.

In the image forming apparatus according to the present invention, said device for depicting an object may include: a device for detecting a change of a position of said object between one frame and another frame subsequent thereto; and a device for controlling alternation of said transparent area and said non-transparent area on the basis of said change.

Said device for controlling alternation may decide whether or not a predetermined area on a screen, which is identical with said transparent area in said one frame, is identical with said transparent area again in said another frame on an assumption that the alternation is not performed, and if identical, may carry out said alternation in said another frame while may postpone said alternation in said another frame if not identical.

Said transparent area and said non-transparent area may alternately be arranged by one pixel in a lengthwise direction and a crosswise direction, and said device for controlling alternation may calculate a binary value by adding coordinate values in the lengthwise direction and the crosswise direction, which define a position of said object on the screen, in said one frame and said another frame, respectively, and then, if the lowest digit in respective added values are not changed, may carry out said alternation in said another frame, while may postpone said alternation in said another frame if the lowest digit in respective added values are changed. Said one frame and said another frame may be continuous to each other.

A background in the present invention may be observed at the back of the object, in which transparent area and non-transparent area are arranged, according to the present invention. Further, other object, a texture and other various elements maybe treated as the background in the present invention. The present invention is not limited to a case such that all of the transparent areas and the non-transparent areas of the object are alternated but it includes a case such that the transparent areas and the non-transparent areas of the object are partially alternated. All of the transparent areas and the non-transparent areas may partially be alternated, respectively or the transparent areas and the non-transparent areas as a portion of the object may be alternated entirely or partially.

DESCRIPTION OF THE PREFERRED EMBODIMENTS

Figure 1A:
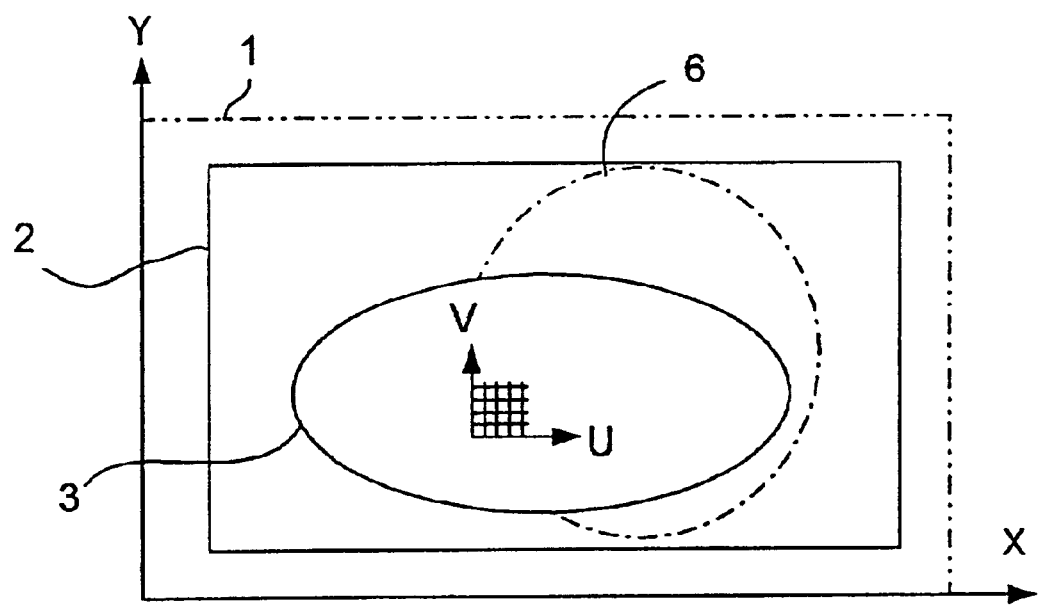
FIGS. 1A to 1C are diagrams for illustrating an outline of an image forming method according to the present invention.
Figure 1B:
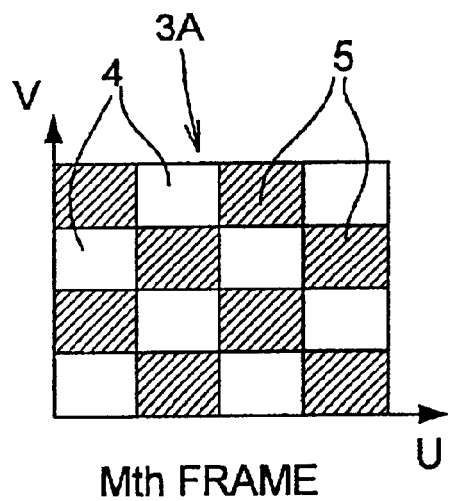
Figure 1C:
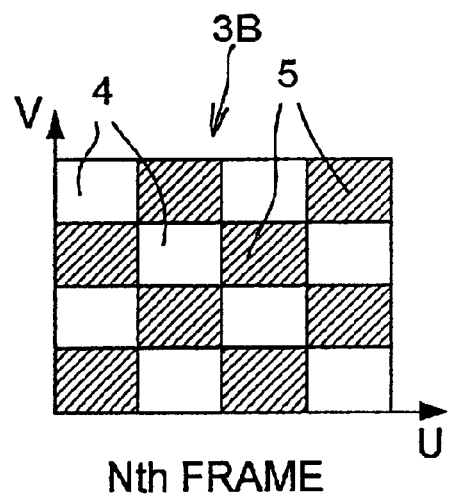

FIGS. 1A to 1C are diagrams for illustrating an example of an image forming method according to the present invention. FIG. 1A shows that a rectangular background 2 is depicted on a virtual screen 1 and an elliptical object 3 is depicted in front of this background 2. Additionally, FIG. 1B shows that a portion of an object 3A is enlarged and FIG. 1C shows that a portion of an object 3B is enlarged, respectively. The object 3A is depicted as the object 3 in the Mth frame and the object 3B is depicted as the object 3 in the Nth frame, respectively. The screen 1 corresponds to a picture to be displayed on a monitor. Alternatively, according to the following explanation, when it is necessary to distinguish the object shown in FIG. 1B and the object shown in FIG. 1C, these objects are represented as an object 3A and an object 3B. On the other hand, when it is not necessary to distinguish the objects shown in FIGS. 1B and 1C from each other, these objects are represented as an object 3. Additionally, in order to distinguish a position on the screen on the basis of the screen 1 from a position on the screen on the basis of the object 3, an orthogonal biaxial coordinate system X-Y having an appropriate position (a left lower position in the drawing) of the screen 1 as an origin is set and this coordinate system is referred to as a screen coordinate system. On the other hand, an orthogonal biaxial coordinate system U-V having an appropriate position of the object 3 as an origin is set and this coordinate system is referred to as an object coordinate system.

As shown in FIG. 1B, the object 3 is provided with transparent areas 4 and non-transparent areas 5 which are arranged in a grid. A degree of transparency of the transparent area 4 is 100, namely, in this area, the background can be seen through completely. A degree of transparency of the non-transparent area 5 is 0, namely, in this area, the background can not be seen at all. The shapes and the sizes of respective transparent areas 4 are equal to each other and the shapes and the sizes of respective non-transparent areas 5 are also equal to each other. Additionally, the shapes and the sizes of the transparent areas 4 and the non-transparent areas 5 are also equal to each other. In other words, according to this embodiment, the object 3 is partitioned at even intervals in its U-V axis directions (a lengthwise direction and a crosswise direction), respectively, and the partitioned areas are set as the transparent area 4 or the non-transparent area 5 alternately to thereby arrange the transparent areas 4 and the non-transparent areas 5 as if a checker flag is formed. Alternatively, the sizes of the transparent areas 4 and the non-transparent areas 5 may be arbitrarily determined, respectively. However, in order to suppress the roughness of the object 3, it is preferable that respective areas 4 and 5 are as small as possible. Preferably, the sizes of respective areas 4 and 5 are set so as to be equivalent to the size of one pixel.

If the object 3, in which the transparent areas 4 and the non-transparent areas 5 are arranged as described above, is depicted so as to be superposed in front of the background 2, the background 2 is observed through the transparent areas 4 as well as the object 3 itself is observed in the non-transparent areas 5. As a result, the object 3 is displayed in a semitransparent state and the background 2 is observed at the rear of the object 3. However, if portions, in which the background 2 is observed through the transparent areas 4, and portions, in which the background 2 is concealed by the non-transparent areas 5, are always fixed, a user will become aware of the difference of the appearances between the transparent areas 4 and the non-transparent areas 5 and as a result, the user may feel the roughness of the image.

Therefore, in the present invention, as shown in FIG. 1C, the object 3B is obtained by inverting the transparent areas 4 and the non-transparent areas 5 with respect to the object 3A shown in FIG. 1B on the bases of the object coordinate system. Then, these object 3A and the object 3B are changed over between the frames to be depicted. In this way, if these objects 3A and 3B are alternately changed over to be depicted, the transparent areas 4 and the non-transparent areas 5 are alternated between a plurality of frames in the object coordinate system. Accordingly, areas on the screen, which were identical with the transparent areas 4 in a frame in which the object 3A shown in FIG. 1B was depicted, are identical with the non-transparent areas 5 in a frame in which the object 3B shown in FIG. 1C is depicted. In the same way, areas of the screen, which were identical with the non-transparent areas 5 in a frame in which the object 3A was depicted, are identical with the transparent areas 4 in a frame in which the object 3B is depicted. Therefore, portions, in which the background 2 are observed through the transparent areas 4, and portions, in which the background 2 are concealed by the non-transparent areas 5, are dynamically changed, so that it becomes difficult for the user to be aware of the difference of the appearances between the transparent areas 4 and the non-transparent areas 5. A period for changing over the object 3A and the object 3B maybe determined arbitrarily. However, in order to suppress the roughness of the screen, it is preferable that the object 3A and the object 3B are changed over for a period as short as possible. For example, preferably, the object 3A and the object 3B may be changed over for each frame (for every $\frac{1}{60}$ seconds).

In the mean time, if the position of the object 3 in the screen coordinate system is fixed, the transparent areas 4 and the non-transparent areas 5 of the object 3 may be regularly alternated for everyone frame or a predetermined number of frames as described above. However, in the case that a position of the object 3 is changed in the screen coordinate system, it is preferable to consider that positional change.

Figure 2A:
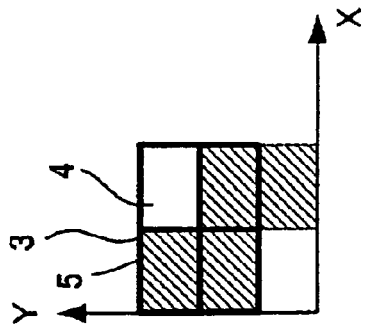
FIGS. 2A to 2C are diagrams for illustrating a relationship between the change of a position of an object shown in FIG. 1A and transparent areas and non-transparent areas.
Figure 2B:
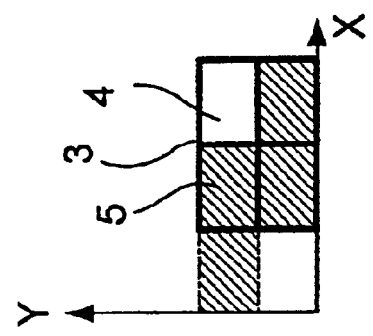
Figure 2C:
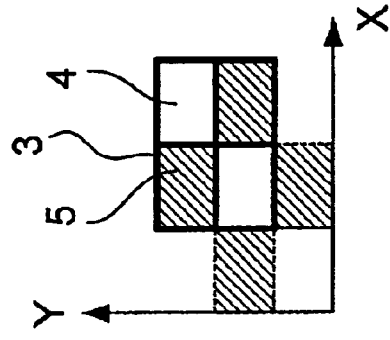

FIGS. 2A to 2C depict a relationship between the transparent area 4 and the non-transparent area 5 before movement and after movement in the case that they are moved between the frames without changing over the object 3 on the basis of the screen coordinate system. However, it is assumed that each of areas 4 and 5 of the object 3 comprises an area equivalent to one pixel, respectively and a rectangle of four pixels is representative of the object 3 in respective frames. As a matter of convenience, a left lower portion of the object 3 before movement is defined as an origin of the screen coordinate system. In the drawing, a broken line denotes the object 3 before movement and a bold line denotes the object 3 after movement, respectively.

As being obvious from the examples shown in FIG. 2B and FIG. 2C, in the case that the object 3 is moved in increments of one pixel in the X axis direction or in the Y axis direction between the frames, the transparent areas 4 and the non-transparent areas 5 are moved in the screen coordinate system in increments of one pixel, respectively, in accordance with this movement. Accordingly, even if the transparent area 4 and the non-transparent area 5 are not alternated on the object 3, the area on the screen, which was identical with the transparent area 4 before movement, is identical with the non-transparent area 5 after movement while the area on the screen, which was identical with the non-transparent area 5 before movement, is identical with the transparent area 4 after movement. Accordingly, in these cases, it becomes unnecessary to change over the objects 3A and 3B. On the other hand, as being obvious from FIG. 2A, in the case that the object 3 is moved in increments of one pixel in the X axis direction and in the Y axis direction, respectively, between the frames, the above described counterchanging of the transparent area 4 and the non-transparent area 5 is not carried out. Therefore, in this case, it is necessary to change over the objects 3A and 3B to thereby alternate the transparent area 4 and the non-transparent area 5 on the object 3. In the case that the object 3 is moved by two or more pixels, in the same way, it is necessary to change over the objects 3A and 3B and alternate the transparent area 4 and the non-transparent area 5 on the object 3. In other words, assuming that the alternation of the area 4 and the area 5 is not performed in the frame after movement, it is decided whether the area of the screen, which was identical with the transparent area 4 in the frame before movement, is identical with the transparent area 4 again or not. Then, if the transparent area 4 in the frame before movement, is identical with the transparent area 4 again, the area 4 and the area 5 are alternated each other in the frame after movement. On the other hand, if the transparent area 4 in the frame before movement, is not identical with the transparent area 4 again, the area 4 and the area 5 are not alternated in the frame after movement.

It is possible to decide whether the object 3A and the object 3B should be alternated or not on the basis of the sum ($\Delta X+\Delta Y$) of the moving amount ($\Delta X$) of the object 3 in the X axis direction and the moving amount ($\Delta Y$) of the object 3 in the Y axis direction between the frames on the assumption that both of the areas 4 and 5 are composed of one pixel. In other words, calculating the sum of the moving amounts ($\Delta X+\Delta Y$) in a binary scale, then, if the lowest digit thereof is changed, it is determined that the changing over of the objects 3A and 3B is not necessary and if the lowest digit thereof is not changed, it is determined that the changing over of the objects 3A and 3B is necessary.

In the next place, a specific apparatus and a specific processing method to carryout the above described image forming method will be explained with reference to FIG. 3 and FIG. 4. Although the image forming method according to the present invention can be used in the image processing in various fields, an embodiment to effect the image forming method according to the present invention by using a portable game machine by the use of a computer will be explained below as one example.

Figure 3:
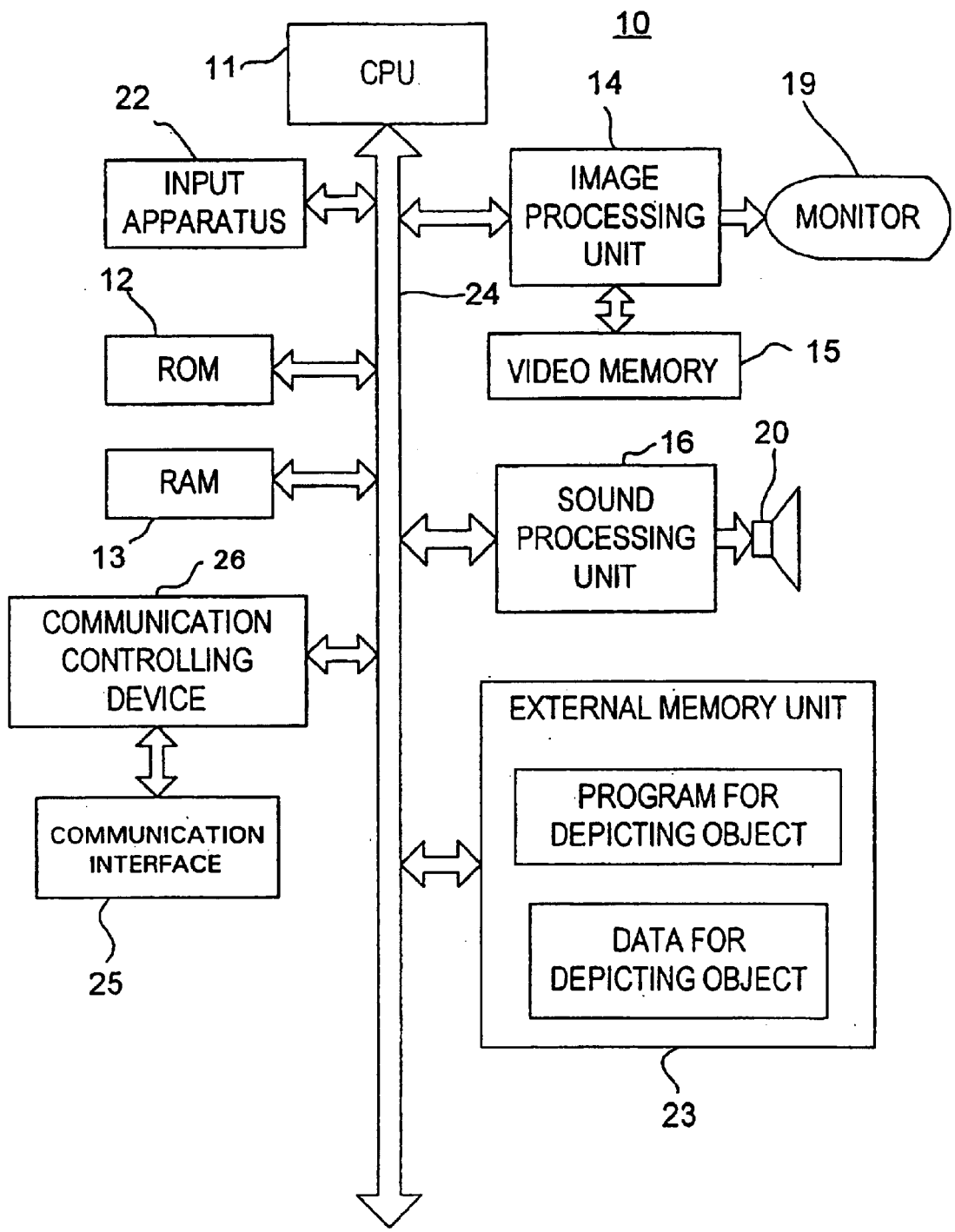
FIG. 3 is a block diagram of a game machine as an example of an apparatus to realize an image forming method according to the present invention.

FIG. 3 is a block diagram of a control system of a typical game machine by the use of a computer. As well known, a game machine 10 as a computer effects a predetermined game in accordance with a program for a game, which is recorded in an external memory unit (for example, a cassette type storage unit incorporating a semiconductor memory) 23. The game machine 10 has a CPU 11, which is mainly configured by a microprocessor, a ROM 12 and a RAM 13 as a main memory unit for the CPU 11 and an image processing unit 14 and a sound processing unit 16 for performing the processing suitable for the image processing and the sound processing on the basis of the instruction from the CPU 11. An operating system is written into the ROM 12 as a program necessary for controlling the entire operation of the game machine 10. The program and the game for the game, which are read from the external memory unit 23, are written into the RAM 13 according to need. The image processing unit 14 renders a predetermined image on a video memory 15 in accordance with the instruction from the CPU 11 or converts the data of the rendered image into a predetermined video reproducing signal to output it to a monitor 19 at a predetermined timing. It is preferable that a liquid crystal monitor is used as the monitor 19.

Depending on the game machine, there is a case that a graphic accelerator function may be equipped in the image processing unit 14 to perform the high-level image processing calculation, and role differentiation of the processing of the CPU 11 and the image processing unit 14 highly depends on the constitution of a hardware. Therefore, according to this embodiment, the explanation will be given on the assumption that the CPU 11 and the image processing unit 14 are regard as a unitary computer. The video memory 15 is illustrated here by citing an example that the video memory 15 is provided to the image processing unit 14 as a memory for depicting exclusive use. However, the video memory may be secured on the RAM 13 as a main memory. The sound processing unit 16 reproduces the data and the sound source data or the like such as the voice and the musical sound or the like, which are read out from the external memory unit 23, to output them from a speaker 20.

Further, an input apparatus 22 and a communication controlling apparatus 26 are connected to the CPU 11, through a bus 24, respectively. The communication controlling apparatus 26 is connected to the suitable communication device (for example, a cellular phone) through a communication interface 25 to control the data communication through a predetermined network. The above described constitution is merely taken as an example, so that a constitution of a computer to which the image forming method according to the present invention is applied may be accordingly changed.

The game program to be recorded in the external memory unit 23 includes a program for depicting an object to realize the image forming method. Alternatively, various data to be used in the game program are stored in the external memory unit 23 and the data include the data for depicting an object, which is necessary for depicting the above described objects 3A and 3B. For example, it is possible to prepare the objects 3A and 3B in advance as the image data in the appropriate format, respectively.

The data for depicting an object is invoked in the case that the object is needed to be depicted according to the present invention in the processing for generating the image data of one frame to be executed by the CPU 11. The outline of the processing by the program for depicting an object will be described with reference to FIG. 4 below. Additionally, it is possible to use a publicly known art as it is for the processing other than a portion concerned with the depiction of the object by the method shown in FIGS. 1A to 1C and FIGS. 2A to 2C, so that the explanation thereof is herein omitted.

Figure 4:
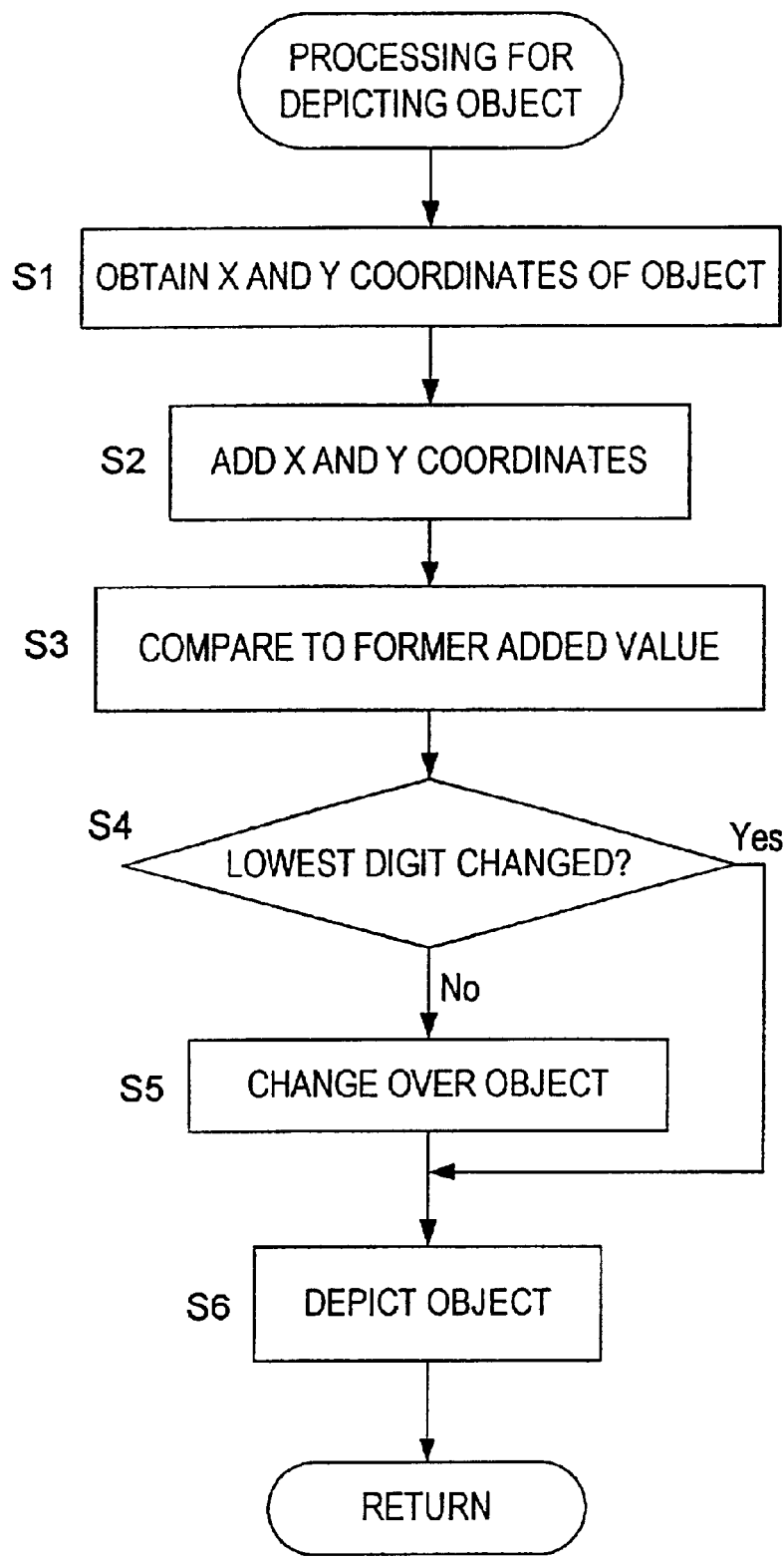
FIG. 4 is a flow chart for illustrating a procedure of the processing for depicting the object, which is performed by the game machine shown in FIG. 3.

In the processing shown in FIG. 4, first of all, the X and Y coordinates of the object 3 in the screen coordinate system in the next frame are obtained (step S1). A position of the object 3 is calculated on the basis of the proceeding of the game. For example, if the object is an object to be operated by the player or an object of which position should be determined in association with that object, the position of the object will be determined with reference to the operation of the player with respect to the input apparatus 22. In the next place, the X and Y coordinates of the object 3 are added to each other in a binary system (step S2), and the obtained value is compared to the former added value (step S3). It is decided whether the values in the lowest digit in the former added value and this added value are changed or not (step S4) Then, if they are not changed, the object 3 to be depicted in the next frame is changed over (step S5). In other words, in the case that the object 3A is depicted in the former frame, the object 3B is selected as the object to be depicted in the next frame. On the basis of this selecting result, the object 3 is depicted (step S6) and then, the depiction processing with respect to one object is terminated. If it is detected that the lowest digit is changed in the step S4, the step S5 is skipped and the object 3 as same as the object in the former frame is depicted in the step S6.

Alternatively, according to the present embodiment, the semitransparent processing to depict the object 3 by blending the object 3 with the background 2 is not used. Therefore, as described above, the present embodiment is preferably applied to a game machine in which a depicting function is provided in such a manner that the headmost semitransparent object is merely blended with the background while any middle object is omitted in the case that the semitransparent processing is designated. In other words, as shown in FIG. 1A, in the case that other object 6 is arranged between the object 3 and the background 2, if the object 3 is depicted as a semitransparent object, the object 6 itself will be erased. However, according to the present embodiment, it is not necessary to depict the object 3 as a semitransparent object, so that the object 6 is precisely depicted between the object 3 and the background 2. In the case that the object 6 is further depicted according to the method of the present invention, it is possible to observe the background 2 in the rear of the object 6.

According to the above described embodiment, it is explained that the two sets of the objects 3A and 3B, in which the arrangement of the transparent areas 4 and the non-transparent areas 5 is inverted from each other, are prepared in advance as the image data, respectively, and the transparent areas 4 and the non-transparent areas 5 are appropriately changed over to be depicted. However, the present invention is not limited to such an example. For example, even in the case that the data of the object is generated according to the calculation processing, it is possible to perform the image forming method according to the present invention if the program for generating the object is regulates so that the transparent area and the non-transparent area are changed over between the frames.

According to the above described embodiment, the shapes of the transparent area 4 and the non-transparent area 5 are rectangles, respectively, however, any shapes other than a rectangle may be available as long as the transparent area 4 and the non-transparent area 5 are alternately arranged. For example, the transparent area 4 and the non-transparent area 5 may be arranged like a honeycombed configuration. Alternatively, the transparent areas 4 and the non-transparent areas 5 may be arranged only in one direction. In other words, the transparent areas 4 and the non-transparent areas 5 may be arranged so as to form stripes in parallel with each other. In the case that the transparent area 4 and the non-transparent area 5 are set in a size other than the size equivalent to one pixel, in the decision whether the transparent area and the non-transparent area are alternated or not, the method shown in FIG. 4 is not capable of being used as it is. However, as long as the transparent area and the non-transparent area are arranged in order, a portion of the object is extracted as an object to be decided and it is inspected whether an area on the screen identical with the transparent area, which is included in the extracted portion in one frame, is identical with the transparent area again when it is assumed that the transparent area and the non-transparent area are not alternated in other frame. On the basis of this result, it is decided whether the transparent area and the non-transparent area should be alternated or not in the entire object including the portions which are not extracted as the object to be decided.

As described above, according to the present invention, the transparent area of the object and the non-transparent area of the object are alternated between a plurality of frames, so that the object and a portion in which its background is seen through are dynamically changed in a plurality of frames. As a result, it becomes difficult for the user to become aware of the difference of the appearances of the transparent area and the non-transparent area, so that the roughness of the screen is resolved. Therefore, it is possible to display the object in a semitransparent state without using a blending processing such as an alpha-blending method, and further, it is possible to improve a quality of an image.

What is claimed is:

1. An image forming method, comprising the steps of:

depicting a predetermined background; and depicting an object, in which a transparent area and a non-transparent area are alternately arranged in at least one direction, so as to superpose said object on the background, wherein, in the step of depicting and object, said transparent area and said non-transparent area are alternated between a plurality of frames in at least part of said object, and said step of depicting an object further includes the steps of:

detecting a change of a position of said object between one frame and another frame subsequent thereto; and controlling alternation of said transparent area and said non-transparent area on the basis of said change.

2. The image forming method according to claim 1, wherein in the step of controlling alternation, it is decided whether or not a predetermined area on a screen, which is identical with said transparent area in said one frame, is identical with said transparent area again in said another frame on an assumption that the alternation is not performed, and if identical, said alternation is carried out in said another frame while said alternation is not carried out in said another frame if not identical.

3. The image forming method according to claim 1, wherein said transparent area and said non-transparent area are alternately arranged by one pixel in a lengthwise direction and a crosswise direction, and in the step of controlling alternation, a binary value obtained by adding coordinate values in the lengthwise direction and the crosswise direction, which define a position of said object on the screen, is calculated in said one frame and said another frame, respectively, and then, if the lowest digit in respective added values are not changed, said alternation is carried out in said another frame, while said alternation is not carried out in said another frame if the lowest digit in respective added values are changed.

4. The image forming method according to claim 1, wherein said one frame and said another frame are continuous to each other.

5. A program for forming an image, which is configured to make a computer perform the steps of:

depicting a predetermined background; and depicting an object, in which a transparent area and a non-transparent area are alternately arranged in at least one direction, so as to superpose said object on the background, wherein, in the step of depicting an object, said transparent area and said non-transparent area are alternated between a plurality of frames in at least part of said object, and said of depicting an object further includes the steps of:

detecting a change of a position of said object between one frame and another frame subsequent thereto; and controlling alternation of said transparent area and said non-transparent area on the basis of said change.

6. The program for forming an image according to claim 5, wherein in the step of controlling alternation, it is decided whether or not a predetermined area on a screen, which is identical with said transparent area in said one frame, is identical with said transparent area again in said another frame on an assumption that the alternation is not performed, and if identical, said alternation is carried out in said another frame while said alternation is not carried out in said another frame if not identical.

7. The program for forming an image according to claim 5, wherein said transparent area and said non-transparent area are alternately arranged by one pixel in a lengthwise direction and a crosswise direction, and in the step of controlling alternation, a binary value obtained by adding coordinate values in the lengthwise direction and the crosswise direction, which define a position of said object on the screen, is calculated in said one frame and said another frame, respectively, and then, if the lowest digit in respective added values are not changed, said alternation is carried out in said another frame, while said alternation is not carried out in said another frame if the lowest digit in respective added values are changed.

8. The program for forming an image according to claim 5, wherein said one frame and said another frame are continuous to each other.

9. An image forming apparatus, comprising:

a first depiction device for depicting a predetermined background; and a second depiction device for depicting an object, in which a transparent area and a non-transparent area are alternately arranged in at least one direction, so as to superpose said object on the background, wherein said second depiction device alternates said transparent area and said non-transparent area between a plurality of frames in at least part of said object, and said second depiction device further includes:

a detection device for detecting a change of a position of said object between one frame and another frame subsequent thereto; and a control device for controlling alternation of said transparent area and said non-transparent area on the basis of said change.

10. The image forming apparatus according to claim 9, wherein said control device decides whether or not a predetermined area on a screen, which is identical with said transparent area in said one frame, is identical with said transparent area again in said another frame on an assumption that the alternation is not performed, and if identical, carries out said alternation in said another frame while does not carry out said alternation in said another frame if not identical.

11. The image forming apparatus according to claim 9, wherein said transparent area and said non-transparent area are alternately arranged by one pixel in a lengthwise direction and a crosswise direction, and said control device calculates a binary value by adding coordinate values in the lengthwise direction and the crosswise direction, which define a position of said object on the screen, in said one frame and said another frame, respectively, and then, if the lowest digit in respective added values are not changed, carries out said alternation in said another frame, while does not carry out said alternation in said another frame if the lowest digit in respective added values are changed.

12. The image forming apparatus according to claim 9, wherein said one frame and said another frame are continuous to each other.

* * * * *